United States Patent
Lebouleux et al.

(10) Patent No.: US 8,115,842 B2
(45) Date of Patent: Feb. 14, 2012

(54) METHOD OF READING AN IMAGE SENSOR SIGNAL AND IMAGE SENSOR

(75) Inventors: Nicolas Lebouleux, Voreppe (FR); Thierry Ligozat, Grenoble (FR)

(73) Assignee: E2V Semiconductors (FR)

( * ) Notice: Subject to any disclaimer, the term of this patent is extended or adjusted under 35 U.S.C. 154(b) by 155 days.

(21) Appl. No.: 12/722,763

(22) Filed: Mar. 12, 2010

(65) Prior Publication Data

US 2010/0231772 A1    Sep. 16, 2010

(30) Foreign Application Priority Data

Mar. 13, 2009  (FR) ..................................... 09 01183

(51) Int. Cl.
    *H04N 3/14*    (2006.01)
    *H03M 1/12*    (2006.01)
(52) U.S. Cl. ...................... 348/294; 348/308; 341/155
(58) Field of Classification Search .......... 348/294–324; 341/155, 169
    See application file for complete search history.

(56) References Cited

U.S. PATENT DOCUMENTS

| | | | |
|---|---|---|---|
| 7,479,916 B1 * | 1/2009 | Reshef et al. ................. | 341/169 |
| 7,532,148 B2 * | 5/2009 | Muramatsu et al. ........... | 341/169 |
| 7,880,662 B2 * | 2/2011 | Bogaerts ....................... | 341/169 |
| 2002/0122129 A1 * | 9/2002 | Lee ............................... | 348/308 |
| 2003/0058360 A1 * | 3/2003 | Liu et al. ....................... | 348/308 |
| 2003/0202111 A1 * | 10/2003 | Park ............................. | 348/243 |
| 2004/0021787 A1 | 2/2004 | Cho | |
| 2005/0168251 A1 | 8/2005 | Lim | |
| 2006/0097902 A1 * | 5/2006 | Muramatsu et al. .......... | 341/155 |
| 2006/0181628 A1 * | 8/2006 | Kishi ............................ | 348/308 |
| 2007/0008206 A1 * | 1/2007 | Tooyama et al. ............. | 341/155 |

(Continued)

FOREIGN PATENT DOCUMENTS

EP    1971139 A2    9/2008

OTHER PUBLICATIONS

Search Report and Written Opinion of French Application No. 0901183 mailed Nov. 12, 2009.

*Primary Examiner* — Sinh Tran
*Assistant Examiner* — Selam Gebriel
(74) *Attorney, Agent, or Firm* — Lowe Hauptman Ham & Berner, LLP

(57) ABSTRACT

The invention relates to matrix-array image sensors with MOS-technology active pixels, comprising a matrix-array of pixels arranged in rows and columns. To read the signal from a pixel, the reset potential present on a column conductor is sampled in two capacitors. The first capacitor is linked to an input of a comparator; the other input receives, through the second capacitor, a linear voltage ramp varying in a first direction for a first duration, then a linear voltage ramp in the reverse direction; a digital value N of the time between the start of this second ramp and the switching over of the comparator is counted; the useful potential present on the column conductor and representing the lighting of the pixel is sampled again, but in the first capacitor only; two ramps identical to the preceding ones are applied to the second input, through the second capacitor; a digital value N' of the time between the start of the second reverse ramp and the switching over of the comparator is counted, the difference between the two counts N and N' representing a measurement of the lighting of the pixel.

2 Claims, 2 Drawing Sheets

U.S. PATENT DOCUMENTS

| | | | |
|---|---|---|---|
| 2007/0216564 A1* | 9/2007 | Koseki | 341/155 |
| 2008/0001802 A1* | 1/2008 | Higuchi | 341/155 |
| 2008/0055432 A1* | 3/2008 | Koseki | 348/241 |
| 2008/0094271 A1* | 4/2008 | Tooyama et al. | 341/155 |
| 2008/0231491 A1* | 9/2008 | Muramatsu et al. | 341/164 |
| 2008/0239124 A1* | 10/2008 | Mori et al. | 348/308 |
| 2008/0252742 A1* | 10/2008 | Oike | 348/222.1 |
| 2009/0079857 A1* | 3/2009 | Kato et al. | 348/294 |
| 2009/0109315 A1* | 4/2009 | Taura | 348/311 |
| 2009/0128653 A1* | 5/2009 | Tanaka | 348/222.1 |
| 2009/0128676 A1* | 5/2009 | Tanaka | 348/300 |
| 2009/0167586 A1* | 7/2009 | Shimomura et al. | 341/169 |
| 2009/0237536 A1* | 9/2009 | Purcell et al. | 348/294 |
| 2009/0256735 A1* | 10/2009 | Bogaerts | 341/169 |
| 2010/0141820 A1* | 6/2010 | Chenebaux et al. | 348/302 |
| 2010/0238336 A1* | 9/2010 | Okamoto et al. | 348/308 |
| 2011/0074994 A1* | 3/2011 | Wakabayashi et al. | 348/302 |

* cited by examiner

METHOD OF READING AN IMAGE SENSOR SIGNAL AND IMAGE SENSOR

RELATED APPLICATIONS

The present application is based on, and claims priority from, French Application Number 09 01183, filed Mar. 13, 2009, the disclosure of which is hereby incorporated by reference herein in its entirety.

FIELD OF THE INVENTION

The invention relates to matrix-array image sensors with MOS-technology active pixels, comprising a matrix-array of pixels arranged in rows and columns.

BACKGROUND OF THE INVENTION

The pixels of one and the same column are linked to a common column conductor which is in turn linked to a respective reading circuit corresponding to this column. The pixels are addressed by a row conductor and, when reading an addressed pixel, a potential representing the electrical charges generated by the lighting of the pixel is applied to the column conductor and transmitted to the reading circuit.

More often than not, the reading is done by double-sampling, that is to say that two successive values of the potential of the column conductor are sampled and the difference in values is measured; one of the values corresponds to the potential taken by the conductor when resetting the pixel after a charge integration phase; the other corresponds to the potential taken because of the charges produced by the lighting of the pixel. The sampling of the column potential is done in a sampling capacitor (or two sampling capacitors).

One way of producing the reading circuit consists in using an analogue-digital convertor of the ramp converter type to directly produce a digital output signal.

The general principle of a ramp analogue-digital converter is as follows: to convert a potential level present on a column conductor, this conductor is linked to a first input of a comparator, and a linear voltage ramp of known slope is applied to a second input of the comparator. The voltage ramp starts, at an instant 0, from a predetermined reference voltage level; a counter counting at a fixed frequency is initiated at the same instant 0. When the voltage level of the second input of the comparator reaches the voltage level imposed on the first input, the comparator switches over; the switching over of the comparator initiates the storage in memory of the content of the counter at the instant of the switchover; this digital content therefore represents the time taken by the ramp of known slope to pass from a reference level to the level present on the column conductor. It therefore represents a digital value of the potential present on this conductor.

For a precision conversion, for example on 14 bits, a long ramp duration is needed (and therefore a low image output rate), or a count at very high frequency is needed; but then, the switchover time of the comparator may introduce an error on the result of the count.

In a matrix-array that comprises as many comparators as there are columns of pixels, there is a risk of having switchover times that are not identical from one comparator to another. This spread of delays creates a fixed pattern noise (FPN) in the image detected, because the systematic counting error is different for each column.

For example, the period of the counter, which corresponds to a least significant bit in the conversion, is approximately 3 ns (frequency 300 MHz); the switchover time can be approximately 300 nanoseconds with a dispersion of 2% between the different comparators, or 2LSB. The fixed noise that results therefrom can be seen in the reproduced image.

This noise could be eliminated by using a single converter for the entire matrix-array, but it would have to work extremely rapidly and would be that much more sensitive to temporal noise; furthermore, it would be necessary to add a sophisticated multiplexor to it which in turn would introduce other sources of fixed noise. It is therefore preferred to use a convertor for each column.

SUMMARY OF THE INVENTION

The invention seeks to propose a solution for avoiding this drawback while allowing for a reading of the potentials of the column conductor by double-sampling in sampling capacitors linked to the column conductor. The inventive solution relies on the use of a ramp generator producing two short ramps of identical durations and identical slopes varying in a first direction and two ramps of identical slopes in a second direction, and a double count of pulses during the ramps of the second direction.

It will be noted that it has already been proposed to make a double count using two linear ramps, in a context in which there is no sampling of the column potential on a sampling capacitor, this double count being designed only to eliminate the influence of the fluctuations of the reset voltage of the column conductor. In this proposal, the ramp is made to start in the second direction from a fixed potential; the comparator has an input linked to the column conductor and a second input linked to a ramp generator. At the moment of the reset of the column potential, the time for which the ramp descends from the fixed potential to the reset potential is counted; then, when the column potential assumes a useful value linked to the lighting of the pixel, the time needed for the ramp to descend from the same fixed potential to the useful potential is counted. By subtracting the two times, a digital value of the difference between the potential linked to the lighting and the reset potential is determined.

However, this device is not suited to a reading circuit in which the column potentials are sampled in capacitors, and also it requires the ramp to start from a starting fixed potential that is high enough not to risk being within a possible margin of fluctuation of the reset potential of the column conductor (fluctuation due to technological dispersion, temperature, etc.).

According to the invention, a method measures and converts to a digital value the lighting of the photosensitive pixels of a matrix-matrix-array of pixels arranged in rows and columns. All of the pixels of one and the same column are able to be selectively linked to one and the same column conductor to apply to this column conductor in succession two potential values, of which one is a reset potential value and the other is a useful potential value linked to the lighting of a pixel. This method uses for each column a voltage ramp generator and a comparator. The reset potential present on the column conductor is sampled in a first and a second sampling capacitors, and this potential is applied subsequently to a first input of the comparator by means of the first capacitor. A linear voltage ramp starting from a reference value and varying in a first direction during a first duration is applied to a second input of the comparator, through the second capacitor. Still through the second sampling capacitor, a linear voltage ramp in the reverse direction is applied to this second input of the comparator. A digital value of the time that elapses between the start of this second ramp and the switching over of the comparator is counted at a fixed frequency in a counter; and the voltage of the ramp is returned to its reference value. The useful potential value present on the column conductor and representing the lighting of the pixel is sampled again, but in the first sampling capacitor only, and this potential is applied, during subsequent to the first input of the comparator by means of the first sampling capacitor. A linear voltage ramp varying in the first direction, starting from the same reference value, and identical in slope and in duration to that of the step b, is applied to the second input of the comparator, through the second sampling capacitor. Still through the second sampling capacitor, a linear voltage ramp in the reverse direction, identical in slope to that of the step c, is applied to the second input of the comparator. A second digital value of the time that elapses between the start of this second ramp and the switching over of the comparator is counted at the same frequency in the counter, the difference between the second and the first digital values representing a measurement of the lighting of the pixel.

The image sensor according to the invention comprises an matrix-array of photosensitive pixels arranged in rows and columns, at least one counter, and, for each column of the matrix-array, a column conductor and a reading circuit to supply a digital value representing the lighting of the pixels of the column. A first and a second sampling capacitors and switches for sampling and storing on these capacitors voltages representing the potential of the column conductor. A comparator having a first input connected to a first terminal of the first capacitor and a second input connected to a first terminal of the second capacitor C2. A linear voltage ramp generator has an output applied to a second terminal of the second capacitor and that is able to establish on this output a reference potential, and also a linear voltage ramp in one direction, and finally a linear voltage ramp in the other direction. A memory for recording and retaining the content presented by the counter at one or more predetermined instants. Means of controlling the switches to sample simultaneously in the two capacitors voltages representing a reset potential of the column conductor, and to subsequently sample, only in the first capacitor, a voltage representing the useful potential of the column conductor. Means of controlling the ramp generator for imposing on the output of the latter the reference potential at least during the phases of sampling the potential of the column conductor in the second capacitor, then for initiating the ramp in the first direction from the reference potential for a fixed short duration, after sampling, and finally for then initiating the ramp in the second direction. Means controlled by the comparator for storing the content of the counter at the instant when the ramp in the second direction starts and the content at the instant when the comparator switches over during this ramp or the difference between these contents.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF DRAWINGS

The present invention is illustrated by way of example, and not by limitation, in the figures of the accompanying drawings, wherein elements having the same reference numeral designations represent like elements throughout and wherein.

DESCRIPTION OF PREFERRED EMBODIMENTS

Figure 1:
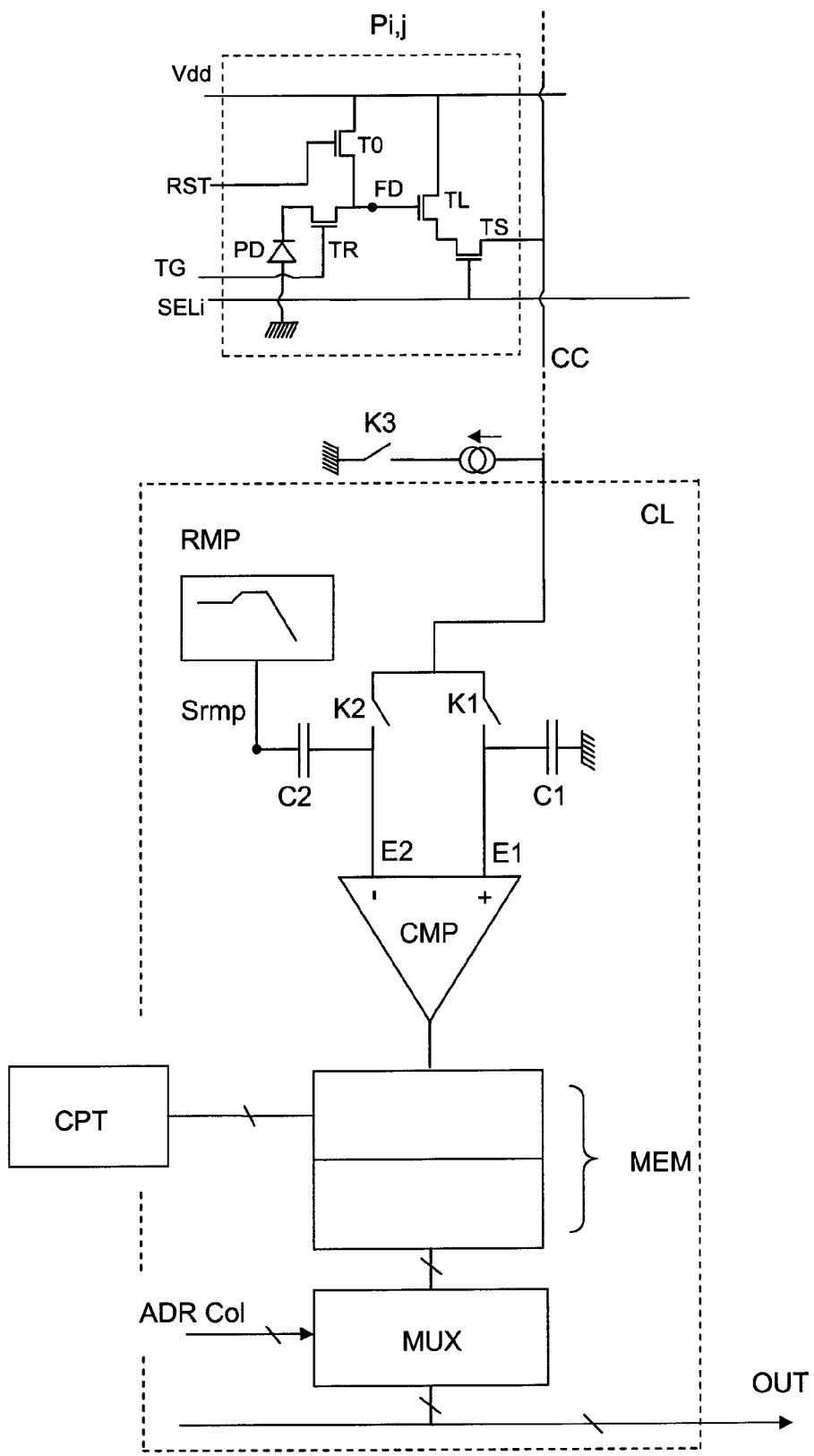
FIG. 1 represents the general structure of a reading circuit according to the invention, associated with a column of pixels of a matrix-array image sensor.

FIG. 1 shows, by way of example, a single active pixel of a matrix-array image sensor; this pixel Pi,j is situated at the intersection of a row of pixels of rank i (not represented) and a column of pixels of rank j (not represented); the pixel comprises a photodiode PD sensitive to the lighting and a few MOS transistors; the reading of charges accumulated during an integration period is done row by row; all the pixels of the row i are selected by a common row conductor SELi which controls the conduction of a transistor TS (selection transistor) in each of the pixels of the row; the conduction of this transistor links the pixel to a column conductor CC, which is common to all the pixels of one and the same column.

The pixel generally comprises from three to five transistors, depending on whether the charges accumulated by the lighting are read directly from the photodiode PD or are read from an intermediate storage node FD. In addition to the selection transistor TS, there is a read transistor TL, the function of which is to establish a potential dependent on the quantity of charges accumulated in the photodiode PD or in the storage node FD and to transfer this potential, through the transistor TS, to the column conductor CC when the pixel is selected. A reset transistor T0 returns the storage node FD (or the photodiode if there is no intermediate node) to a fixed potential before recommencing a charge integration period. The pixel represented by way of example comprises four transistors and an intermediate storage node; a transfer transistor TR transfers the charges from the photodiode to this node.

The reading circuit CL is placed at the foot of the column and there is one thereof per column. The input of the circuit CL comprises the column conductor CC. The output is on a digital bus.

The reading of an addressed pixel is done in two stages so as to systematically eliminate a certain number of errors. It will be considered hereinafter that the pixel is a pixel with intermediate storage node, bearing in mind that if there is no intermediate node the order of the phases can be reversed. In a first stage, a reset potential is sampled, which represents the potential of the storage node FD emptied of its charges. In a second stage, the charges are diverted from the photodiode PD to the storage node, modifying the potential of this node and consequently modifying the potential of the column conductor; this second level is read and the first level is subtracted from the second to obtain a differential measurement eliminating systematic error causes.

The reading circuit according to the invention comprises the elements listed below and sequencing means that apply particular commands to these elements:

two sampling capacitors C1 and C2 and switches K1 and K2 arranged to allow for the storage and retention on these capacitors of voltages representing the potential of the conductor CC;

a comparator CMP having an input E1 connected to a terminal of the first capacitor C1 and an input E2 connected to a first terminal of the second capacitor C2; the second terminal of the first capacitor is preferably linked to a 0 potential ground;

a ramp generator RMP which has an output Srmp linked to a second terminal of the capacitor C2 and which is able to establish on this output on the one hand a reference potential Vref, a linear voltage ramp in one direction, and a linear voltage ramp in the other direction; the slopes are fixed, but not necessarily identical;

a counter CPT which receives a fixed clock frequency, this counter is a simple counter, it is not necessary for it to have a counting mode and a down-counting mode; the counter can be common to all the reading circuits;

a memory MEM for storing and retaining the content of the counter at one or more predetermined instants.

The expression "linear voltage ramp" should be understood to mean a voltage that increases or decreases in an overall linear fashion, even if, on a microscopic scale, the voltage varies in stair treads, for example in the case where it is produced by a digital-analogue convertor and a counter.

The sequencing means notably comprise:

means of controlling the switches K1 and K2 for simultaneously sampling in the capacitors C1 and C2 voltages representing the reset potential of the column conductor, that is to say the potential present immediately after a reset phase for the pixel of the row currently being read; and means for sampling only in the first capacitor C1 a voltage representing the useful potential of the column conductor which is the potential present on the column conductor and representing the charges linked to the lighting of the pixel (for example, in the case of a pixel with four transistors, after a transfer of charges from the photodiode PD to the intermediate storage node FD);

means of controlling the ramp generator RMP for imposing on the output Srmp of the latter the reference potential Vref at least during the sampling phases of the column conductor potential, initiating the ramp in the first direction from the reference potential Vref for a short fixed duration, after the sampling in the first capacitor, and for then initiating the ramp in the second direction and simultaneously initiating a count by the counter (or at least the identification of a counter content at the instant when the ramp starts);

means controlled by the comparator for storing the content of the counter at the instant when the comparator switches over during the ramp in the second direction (for storing the difference between the content of the counter at the moment when the comparator switches over and the content at the start of the ramp).

The sequencing means consist of pure logic circuits (counting, opening and closing logic gates, etc.) the construction of which is easily deduced from the desired sequencing. They are not described in detail so as not to overburden the description and the diagrams.

The memory MEM records the contents of the counter at the instants when the comparator switches over. It is able to store two counting values, one for the reset phase, one for the useful measurement phase. It can be double and operate alternately, inasmuch as it makes it possible to record the two count values of a read (reading of pixel of row i for example) while retaining for a certain time the two count values of the preceding read (pixel of row i-1) until the values of this preceding measurement have been extracted from the sensor for all the columns. This is why the memory MEM is represented in two parts in FIG. 1.

Finally, the memory MEM can be read by a multiplexor MUX, addressed by a column decoder. The multiplexor directs to an output OUT of the image sensor one or two digital values representing the lighting recorded in the memory MEM, that is to say the lighting of the pixel of a row that has just been read. The multiplexor thus successively extracts the contents of the memories MEM of all the columns for a predetermined row, after which it recommences for a next row.

The two count values can be extracted to the output OUT of the image sensor and subtracted from one another outside the reading circuit or even outside the sensor. Alternatively, the subtraction can be done directly in the reading circuit so as to supply to the output of the sensor only the result of the subtraction for each pixel. The subtraction circuit that is then needed is not represented.

Finally, FIG. 1 shows a current source linked to the foot of the column conductor CC via a switch K3. This current source may be necessary, notably in the case of the four-transistor construction represented in FIG. 1, for the following reason: the reading transistor TL, mounted as a following transistor, can transfer the voltage from the storage node FD to the column conductor only if this transistor is conducting; to render it conducting, it is demanded that the column conductor pull a current from the source of the transistor TL through the transistor TS; and for this, a current is pulled from the column conductor by a current source at the foot of the column; the switch K3 is conducting throughout the duration of the reading of the pixel.

Figure 2:
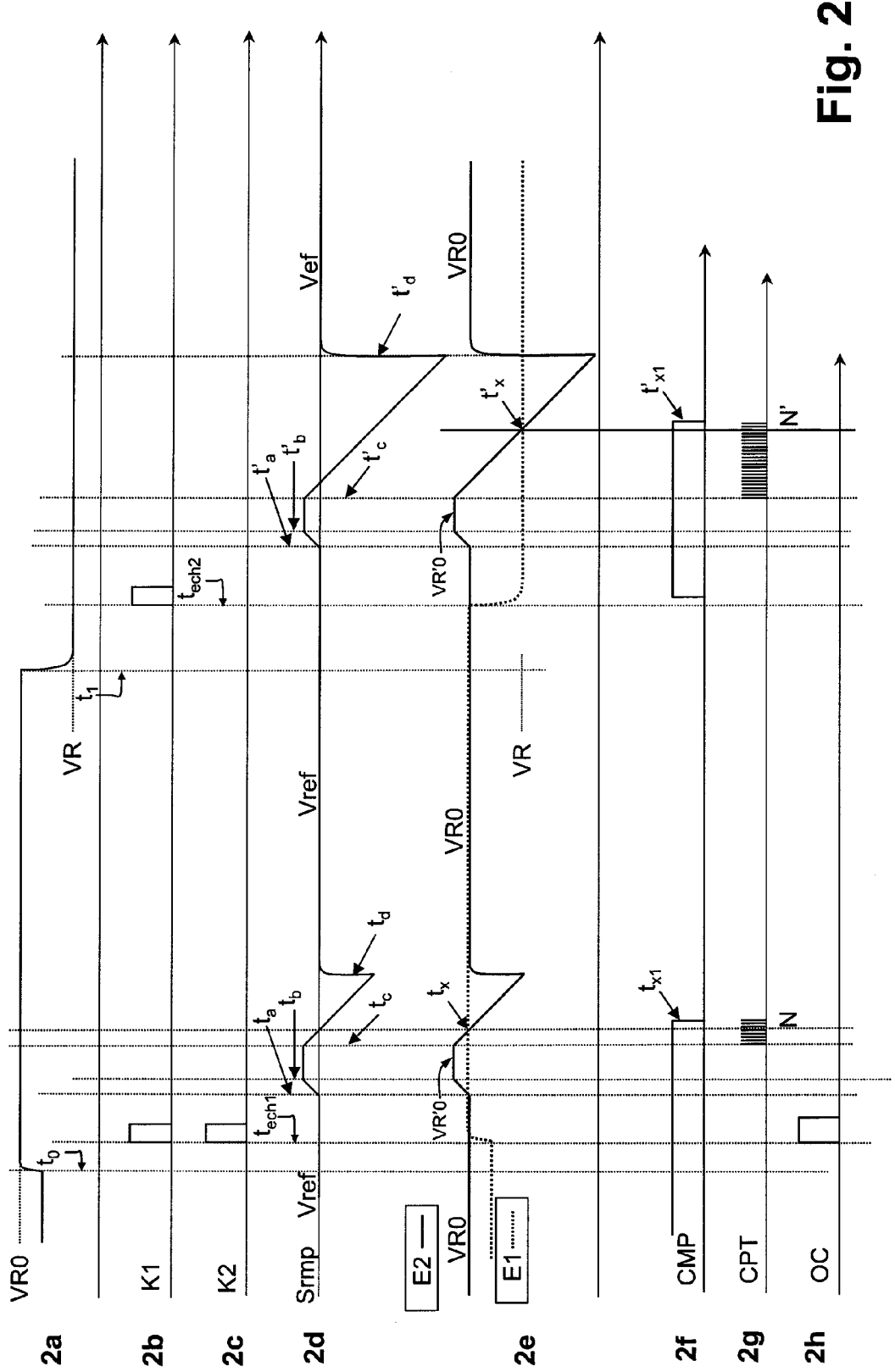
FIG. 2 represents a sequencing time diagram of the operation of the circuit of FIG. 1.

There now follows a description of the detailed operation of the sensor according to the invention, with reference to the timing diagrams of FIG. 2, in the case of the pixel with four transistors, the transistors in this case being NMOS transistors and the lighting of a pixel provoking the reduction, proportional to the lighting, of the potential of the intermediate storage node, and therefore of the potential of the column conductor.

The row 2a shows the potential of the column conductor during the reading of a pixel; the sequence begins at an instant t0 at the moment of reset of the pixels of the row; this reset consists in making the reset transistors T0 of all these pixels conductive; the charge storage node is emptied and the potential of the column conductor is stabilized at a positive initial value VR0 which is the so-called reset potential. At a subsequent instant t1, the charges are diverted from the photodiode into the storage node FD and the potential of the conductor CC is established at a useful value VR that becomes lower as the lighting increases. The reading of the pixel consists in measuring and supplying in digital form a value representing the difference between the useful potential VR and the reset potential VR0.

FIGS. 2b and 2c show the sampling pulses, that is to say the pulses controlling the conduction of the switches K1 and K2. At the instant $t_{ech1}$, the switches K1 and K2 are made to conduct (first sampling); at the instant $t_{ech2}$, only the switch K1 is made to conduct (second sampling).

FIG. 2d shows the potential on the output Srmp of the ramp generator RMP. The output is initially at the reference potential Vref, and remains at this potential at least during the first sampling pulse; it will be equal to Vref during the second sampling pulse. The closure of the switch K2 therefore charges the capacitor C2 with a voltage equal to the difference between the reset potential of the column conductor and Vref; it will keep this voltage until the end of the read.

After the first sampling pulse and while the column conductor is still at the reset potential, a first double voltage ramp is initiated on the output Srmp; the double ramp first comprises an increasing ramp of fixed duration and slopes ranging from an instant $t_a$ to an instant $t_b$; then, after a possible level, a decreasing ramp (the slope may be different) ranging from an instant $t_c$ to an instant $t_d$; after the instant $t_d$, the voltage on the output Srmp is returned to Vref and maintained at Vref until an instant $t'_a$ situated after the second sampling pulse. At the instant $t'_a$, a second double ramp is established, beginning with an increasing ramp identical in slope and duration to the increasing part of the first ramp, until an instant $t'_b$, such that $t'_b-t'_a=t_b-t_a$, a possible level is provided and a descending ramp with a slope identical to the descending ramp of the first ramp but of longer duration is initiated at an instant $t'_c$ and goes to an instant $t'_d$. The output Srmp is then returned to the reference potential Vref.

FIG. 2e represents the trend of the potential of the inputs E1 (dotted lines) and E2 (solid lines) of the comparator CMP. The input E1 takes the value of the reset potential VR0 after the first sampling pulse, then takes the value of the useful potential VR after the second sampling pulse. The input E2 of the comparator follows the trend of the ramp, but, because, at the instant $t_a$, the capacitor C2 is charged at the reset potential VR0−Vref and then remains charged at this value, the input E2 follows the voltage of the ramp with an offset of VR0−Vref (solid line curve). It starts from VR0, climbs to a value VR'0 because of the first increasing ramp, remains there during the level from $t_b$ to $t_c$, redescends below VR'0 because of the first decreasing ramp, returns to VR0 at $t_d$, climbs back to VR'0 between $t_a$ and $t_c$ because of the second increasing ramp that is identical in slope and duration to the first ramp, redescends below VR because of the second decreasing ramp that is longer than the first, and finally returns to VR0 at $t'_d$.

The comparator CMP switches over in one direction or the other depending on the relative values of the input E1 and E2 potentials. The comparator assumes a first state between the instants $t_b$ and $t_c$ when the potential on the input E2 is higher than on the input E1 because these potentials have the same value VR0 at the outset and the ramp causes the potential of E2 to climb (to VR'0) but not that of E1. At an instant $t_x$ situated between $t_c$ and $t_d$ the potential of E2 redescends below E1 and the comparator switches over to its second state.

The potentials on E1 and E2 become equal to VR0 again after the instant $t_d$. Then, the potential of E1 changes to VR at the moment of the second sampling. VR is lower than VR0 and the comparator switches back to the first state (or in any case switches over to the first state during the second increasing ramp between the instants $t'_a$ and $t'_b$). At an instant $t'_x$ of the second descending ramp, the comparator switches over to the second state.

FIG. 2f represents the state of the output of the comparator; because of the delay specific to the comparator, the output switches over at instants $t_{x1}$ and $t'_{x1}$ which are slightly delayed relative to the instants $t_x$ and $t'_x$ where the potential levels on E1 and E2 cross over.

FIG. 2g symbolically represents the time counting performed by the counter CPT. Two counting operations are performed, at one and the same fixed frequency. The first is a count of the time that elapses between $t_c$ and $t_x$, the count represented by a number N of counting pulses between these two instants; the second is a count of the time between $t'_c$ and $t'_x$ represented by a number N'; the count by the counter CPT is therefore initiated at the same time as the start of the decreasing ramps (at the instants $t_c$ and $t'_c$), or, if the counter counts permanently, the state of the counter is recorded at these instants; the count is stopped at the instant of the switchover of the comparator CMP to the second state, that is to say, at the instants $t_{x1}$ and $t'_{x1}$. The expression "stopped" should be understood to mean that the content of the counter is read at these instants, even if the counter continues to count, for example in the case where it would be the same counter used to construct the voltage ramps in association with a digital-analogue converter. To stop the content of the counter, it is possible to simply provide for the output of the comparator to be used to initiate the writing of the content of the counter at the instant $t_{x1}$ or $t'_{x1}$ into a register or directly into the memory MEM.

To implement the invention, the difference between the contents N and N' stored at these two instants is established; the potential levels on the input E2 are the same at the instants $t_a$ and $t'_a$; they are the same at the instants $t_b$ and $t'_b$ (same increasing ramp slope and duration); they are the same at the instants $t_c$ and $t'_c$ (level); the potential level on the input E1 is VR0 at the instant $t_x$ and VR at the instant $t'_x$; the identity of the starting potentials and the identity of the slope of the ramp and of the frequency of the counter imply that the difference in the two counts represents the difference between the value VR0−VR'0 and the value VR'0−VR, and therefore the difference between VR0 and VR which represents the lighting that we are seeking to measure.

The comparator's switchover delay time is eliminated during the subtraction because it is not different during the first and second switchovers.

The structure of the circuit according to the invention and the sequencing that has just been explained do not mean having to construct a fixed voltage source of clearly determined value VR'0 greater than VR0 despite the possible dispersions and variations of VR0. In practice, VR'0 is established directly from VR0 regardless of the value VR0 thanks to the increasing ramp. This ramp can be of very short duration because the difference VR'0−VR0 can be very low. It must only allow for a switchover of the comparator to its first state.

FIG. 2 also shows a row 2h which represents an autozero pulse of the comparator. The comparator CMP is in fact preferably designed to have an offset clear input OC, or autozero input. It is then desirable to apply a pulse to the input OC during the first sampling pulse, that is to say during the simultaneous closure of the switches K1 and K2. This pulse acts to place in memory in the comparator the offset voltage of the comparator, to subtract it during the subsequent phases. During the simultaneous closure of the switches K1 and K2, the inputs E1 and E2 are strictly at the same potential and the comparator records the correction voltage that must be subtracted from one or other input for the comparator to be exactly at its switchover threshold. This correction voltage is in memory in a capacitor internal to the comparator and is retained throughout the subsequent phases.

In a configuration in which it is sought to encode the lighting on 14 bits for example, the memory which records N' must have at least 14 bits, but the memory or the storage register that records the number N can be of very small size, for example 7 or 8 bits. These 7 or 8 bits will be subtracted from the low order bits of the number N'. In practice, it is possible to provide for each column a 24-bit register to store the two numbers N and N' before making the subtraction. The subtraction can also be made outside the reading circuit, and even outside the sensor chip.

It will be noted that the slope of the rising ramp does not need to be identical to the slope of the descending ramp, but the rising slopes must remain identical during the two phases of the conversion, as must the descending ramps. One way of producing the ramp generator consists in using a charge capacitor linked between the reference potential Vref and the output Srmp, two current sources, one to charge the capacitor (rising ramp) and the other to discharge the capacitor (descending ramp), a set of switches to select the current source or sources, and to short circuit the capacitor when the output Srmp must be returned to Vref. The switches can be controlled by specific counters, or from the outputs of the general counter used to count the durations; in practice, the duration of the rising ramp is fixed, for example a duration of 64 pulses (6 bits); the duration of the first descending ramp is fixed and can be from 256 to 1024 pulses (8 to 10 bits), or else this ramp can be stopped by the switching over of the comparator at the instant $t_{x1}$. The duration of the second descending ramp can be 16384 pulses (14 bits) or more.

However, the ramp generator can also be produced with a digital-analogue converter and a counter controlled by a sequencer for counting in one direction or in the other from predetermined instants. This counter can be the counter CPT for counting the durations to be measured or a different counter.

The ramps can be made by a ramp generator common to all the columns. It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A method of measuring and converting to a digital value the lighting of the photosensitive pixels of an matrix-array of pixels arranged in rows and columns, all the pixels of one and the same column being able to be selectively linked to one respective column conductor to apply to this conductor in succession two potential values, of which one is a reset potential value and the other is a useful potential value linked to the lighting of a pixel, this method using for each column a voltage ramp generator and a comparator, said method comprising the following steps:

a)—the reset potential present on the column conductor is sampled in a first and a second sampling capacitors, and this potential is applied during the following steps b and c to a first input of the comparator by means of the first sampling capacitor;

b)—a linear voltage ramp starting from a reference value and varying in a first direction during a first duration is applied to a second input of the comparator, through the second capacitor;

c)—still through the second capacitor, a linear voltage ramp in the reverse direction is applied to this second input of the comparator; a digital value of the time that elapses between the start of this second ramp and the switching over of the comparator is counted at a fixed frequency in a counter; and the voltage of the ramp is returned to its reference value;

d)—the useful potential value present on the column conductor and representing the lighting of the pixel is sampled again, but in the first capacitor only, and this potential is applied, during the following steps e and f, to the first input of the comparator by means of the first capacitor;

e)—a linear voltage ramp varying in the first direction, starting from the same reference value, and identical in slope and in duration to that of the step b, is applied to the second input of the comparator, through the second capacitor;

f)—still through the second capacitor, a second linear voltage ramp in the reverse direction, identical in slope to that of the step c, is applied to the second input of the comparator; a second digital value of the time that elapses between the start of this second ramp and the switching over of the comparator is counted at the same frequency in the counter, the difference between the second and the first digital values representing a measurement of the lighting of the pixel.

2. An image sensor comprising an matrix-array of photosensitive pixels arranged in rows and columns, at least one counter, and, for each column of the matrix-array, a column conductor and a reading circuit to supply a digital value representing the lighting of the pixels of the column, the reading circuit comprising:

a first and a second sampling capacitors and switches for sampling and storing on these capacitors voltages representing the potential of the column conductor;

a comparator having a first input connected to a first terminal of the first capacitor and a second input connected to a first terminal of the second capacitor;

a linear voltage ramp generator having an output applied to a second terminal of the second capacitor and that is able to establish on this output either the reference potential, or a linear voltage ramp in one direction, or a linear voltage ramp in the other direction, a memory for storing and retaining the content of the counter at one or more predetermined instants, means of controlling the switches to sample simultaneously in the two capacitors a reset potential of the column conductor, and to subsequently sample, only in the first capacitor, a useful potential of the column conductor;

means of controlling the ramp generator for imposing on the output of the latter the reference potential at least during the phases of sampling the potential of the column conductor in the second capacitor, then for initiating the ramp in the first direction from the reference potential for a fixed short duration, after sampling, and finally for then initiating the ramp in the second direction;

means controlled by the comparator for storing the content of the counter at the instant when the ramp in the second direction starts and the content at the instant when the comparator switches over during this ramp, or else the difference between these contents.

* * * * *